US008090702B2

(12) United States Patent
Howard et al.

(10) Patent No.: US 8,090,702 B2
(45) Date of Patent: Jan. 3, 2012

(54) ANALYZING WEB SITE TRAFFIC

(75) Inventors: Steven Howard, Irving, TX (US); Robert S. Keller, Colleyville, TX (US); Michael S. Nichols, Southlake, TX (US); Travis M. Woodruff, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 11/531,089

(22) Filed: Sep. 12, 2006

(65) Prior Publication Data

US 2008/0065677 A1 Mar. 13, 2008

(51) Int. Cl.
*G06F 7/00* (2006.01)
*G06F 17/30* (2006.01)

(52) U.S. Cl. ......................... 707/707; 707/710; 707/712

(58) Field of Classification Search ........................ None
See application file for complete search history.

(56) References Cited

U.S. PATENT DOCUMENTS 6,618,754 B1 * 9/2003 Gosling ........................ 709/220
2003/0100995 A1 5/2003 Loraine et al.
2004/0019518 A1 * 1/2004 Abraham et al. ............... 705/10
2005/0050021 A1 * 3/2005 Timmons .......................... 707/3
2005/0055644 A1 * 3/2005 Stockton ....................... 715/766
2005/0102292 A1 * 5/2005 Tamayo et al. ................. 707/10
2005/0114545 A1 5/2005 Gopalan et al.
2005/0210297 A1 9/2005 Wu et al.
2005/0262363 A1 11/2005 Claseman
2006/0010161 A1 * 1/2006 Muenkel ................... 707/103 X
2006/0069671 A1 * 3/2006 Conley et al. ..................... 707/3
2006/0087683 A1 4/2006 King et al.
2006/0265495 A1 * 11/2006 Butler et al. .................. 709/224
2007/0067265 A1 * 3/2007 Husfelt et al. .................... 707/3
2007/0214420 A1 * 9/2007 Guertler et al. ............... 715/742
2007/0220144 A1 * 9/2007 Lovell .......................... 709/224
2008/0133510 A1 * 6/2008 Timmons .......................... 707/5

OTHER PUBLICATIONS

Malacinski, A., et al., "Measuring Web Traffic, Part 1," Mar. 2001, http://www-128.ibm.com/developerworks/web/library/wa-mwtl/, pp. 1-10.

* cited by examiner

*Primary Examiner* — Rehana Perveen
*Assistant Examiner* — Raheem Hoffler
(74) *Attorney, Agent, or Firm* — Heslin, Rothenberg Farley & Mesiti P.C.

(57) ABSTRACT

Methods and arrangements to analyze web traffic of a portal are contemplated. Embodiments include transformations, code, state machines or other logic to analyze web traffic of a portal by a portlet receiving a request for web page content from the portal and generating a fragment of a web page. The fragment may include code to collect data from clients on web traffic of the portlet and to transmit the data to a facility for the collection of data on web traffic of the portal and the portlet. Some embodiments may involve a portal requesting web page content from a portlet, and the portal receiving a fragment of a web page from the portlet. The fragment may include code to collect data from clients on web traffic of the portlet and to transmit the data to the data collection facility.

21 Claims, 5 Drawing Sheets

2/5

200
265
OTHER COMPUTERS
COMPUTER
205
RAM
210
PORTLET MODULE
260
COMMS ADAPTER
215
RECEIVER
220
GENERATOR
235
PROCESSOR
225
OPERATING SYSTEM
SYSTEM BUS
275
I/O INTERFACE ADAPTER
270
HARD DISK
OPTICAL
FLASH
240
245
250
255
NON-VOLATILE MEMORY
USER INPUT DEVICE
DISPLAY DEVICE
280
290

ANALYZING WEB SITE TRAFFIC

FIELD

The present invention is in the field of communications over a network. More particularly, the present invention relates to methods and arrangements to analyze the web traffic of portals.

BACKGROUND

Web site traffic analysis is the process of collecting and analyzing data about a web site's traffic to determine the web site's usage patterns and help measure the site's performance and effectiveness. The analysis may examine the total number of visitors to a site, the portions of a site visited, the duration of the visits, and the details of the interactions with the site, such as search queries generated by the visits. Web site traffic analysis is important to the effective functioning of web sites. By some estimates, the business of web site traffic analysis may gross over a billion dollars a year.

Web site traffic analysis may be performed by creating logs with entries for each Hypertext Transfer Protocol (HTTP) request or hit to the web site server. A log entry may be used to generate information about the number of hits, visitors, visitor duration, visitor origin (sub domain, referral link), visitor IP address, browser type and version, platform, cookies, and details of interaction with the web site. Web site traffic analysis may also be performed by creating records of the links or Uniform Resource Locators (URLs) visited at a web site.

Web servers may utilize a portal architecture. In this architecture, multiple applications called portlets are integrated into a single, customizable application called a portal. Content provided by multiple portlets may be displayed on a single page, and a user may interact with an individual portlet on a page without necessarily affecting the state of other portlets on the page. The portlets may be local, run by the web server, or remote. A remote portlet for a portal may be operated by a different enterprise than operates the portal. For example, the portlet may provide weather information to a large number of unrelated portals.

Traditional methods of web site traffic analysis may fail to capture critical information about web site usage of portals. To understand the usage of a portal site, the following data may prove useful for analysis:

the name of the portal page being displayed, the names of all the portlets on the page, the states of the portlets on the page (normal, minimized, maximized, etc.), miscellaneous data about state internal to and specific to each portlet on the page, and the user id of the user using the portal.

The data listed above may prove unavailable under traditional methods of web site traffic analysis. The web pages generated by portal servers may, for example, not reveal that the pages are portal pages. The pages may consist of Hypertext Markup Language (HTML) pages which contain fragments corresponding to the portlets. The web servers may not place easily extractable information into the page HTML regarding the portal environment, the portal page, or the individual portlets. The portlets themselves may be presented as nested tables with no identification. It may, therefore, prove difficult to determine from the page the details of the interaction between a user and an individual portlet. Further, reliance on records of server URLs may prove problematic. The server URLs may be highly dynamic, reflecting the changing content of portlets in response to user actions. Thus, a logged URL may no longer exist when an analysis is performed. Further, the URL may not expose all relevant information about the state of the page being viewed. Moreover, relying on the server to gather data about web site traffic may miss revisits to cached pages. These pages may be viewed again by retrieval from the cache without making an HTTP request of the server.

In addition, under traditional methods of web site traffic analysis, the integration of the collected data may prove difficult. The data about web site traffic may be written to multiple log files without a common identifier to tie them together. Further, the generation of server-created logs by a portal may consume large amounts of the portal's storage or may require intensive computing resources from the portal. Further, a portal may not deliver the logs to the web site traffic analysis provider in a timely fashion.

SUMMARY OF THE INVENTION

The problems identified above are in large part addressed by methods and arrangements to analyze web traffic of a portal. One embodiment provides a method to analyze web traffic of a portal. The method may involve receiving, by a portlet from the portal, a request for web page content. The method may also involve generating, by the portlet, a fragment of a web page responsive to the request. The fragment may include code to collect data from clients on web traffic of the portlet and to transmit the data to a facility for the collection of data on web traffic of the portal and the portlet. The method may also include transmitting the fragment back to the portal.

Another embodiment includes a method to analyze web traffic of a portal. The method may include requesting web page content. The request may be made by a portal to a portlet. The method may also include receiving a fragment of a web page responsive to the requesting. The portal may receive the fragment from the portlet. The fragment may include code to collect data from clients on web traffic of the portlet and to transmit the data to a facility for the collection of data on web traffic of the portal and the portlet. The method may also include generating a web page by the portal. The web page may include the fragment of a web page. The method may also include transmitting the web page to a client.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to analyze web traffic of a portal are contemplated. Embodiments include transformations, code, state machines or other logic to analyze web traffic of a portal by receiving by a portlet a request for web page content from the portal. The embodiments may also involve generating, by the portlet, a fragment of a web page responsive to the request. The fragment may include code to collect data from clients on web traffic of the portlet and to transmit the data to a facility for the collection of data on web traffic of the portal and the portlet. The embodiments may also include transmitting the fragment back to the portal.

Some embodiments may involve requesting web page content. The request may be made by a portal to a portlet. The embodiments may also include receiving a fragment of a web page responsive to the requesting. The portal may receive the fragment from the portlet. The fragment may include code to collect data from clients on web traffic of the portlet and to transmit the data to a facility for the collection of data on web traffic of the portal and the portlet. The embodiments may also include generating a web page by the portal. The web page may include the fragment of a web page. The embodiments may also include transmitting the web page to a client.

While specific embodiments will be described below with reference to particular circuit or logic configurations, those of skill in the art will realize that embodiments of the present invention may advantageously be implemented with other substantially equivalent configurations.

Figure 1:
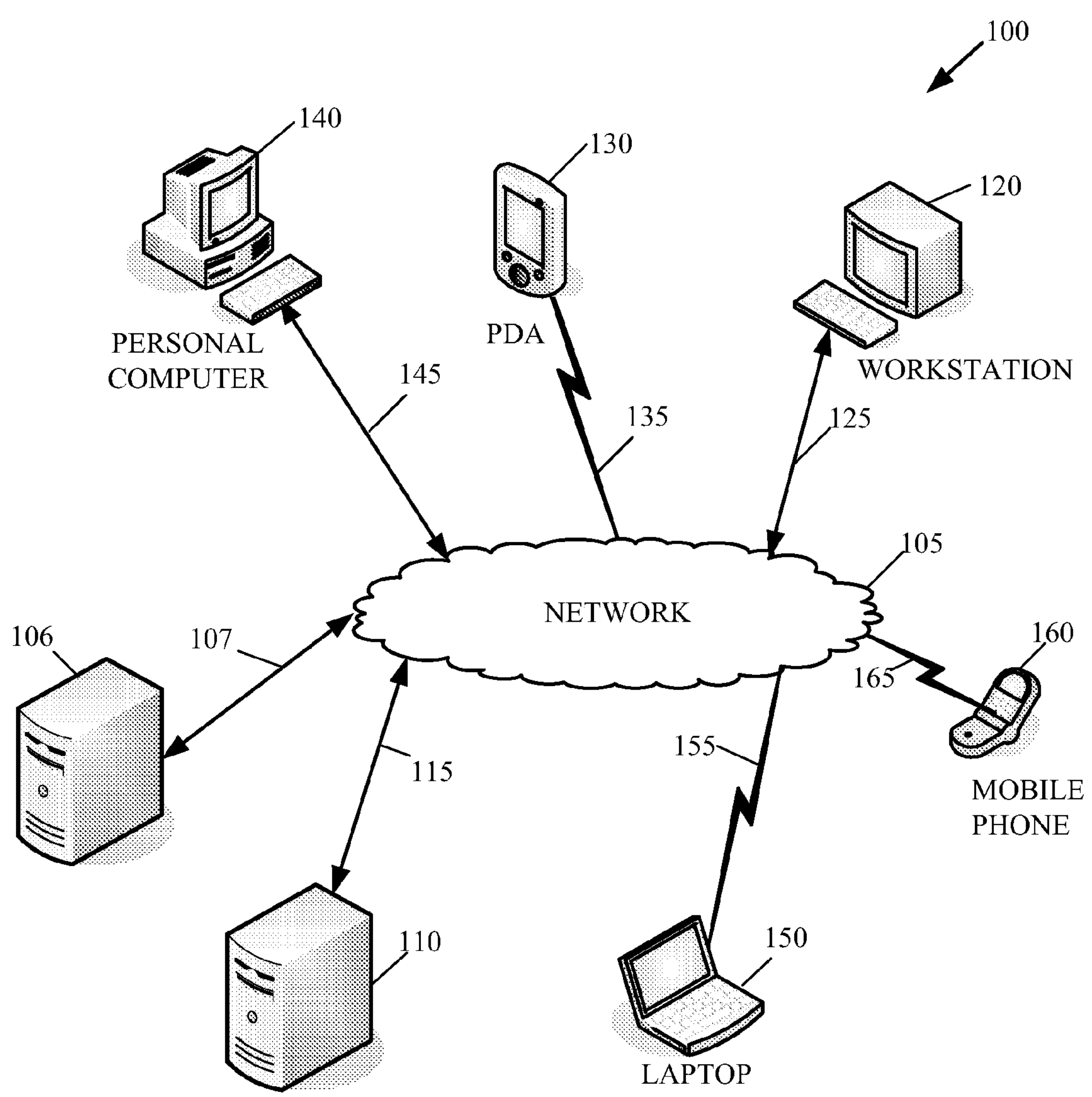
FIG. 1 depicts a network diagram of a system to analyze the web site traffic of portals.

FIG. 1 depicts a diagram of an embodiment of a networked system 100 capable of analyzing web traffic of a portal. The system 100 includes a network 105, portal server 106 connected to network 105 through wireline connection 107, portlet server 110 connected to network 105 through wireline connection 115, and a variety of client devices capable of browsing web pages produced by portal server 106 including:

- workstation 120, a computer coupled to network 105 through wireline connection 125,
- personal digital assistant (PDA) 130, coupled to network 105 through wireless connection 135,
- personal computer 140, coupled to network 105 through wireline connection 145,
- laptop computer 150, coupled to network 105 through wireless connection 155; and
- mobile phone 160, coupled to network 105 through wireless connection 165.

Network 105, which may consist of the Internet or another wide area network, a local area network, or a combination of networks, may provide data communications among the portal server 107, the portlet server 110, and the client devices 120, 130, 140, 150, and 160. Portal server 106 may generate web pages for a portal. A portal is a web site which may aggregate information obtained from local or remote data sources such as databases, transaction systems, and syndicated content providers. Portals may aggregate this information into composite pages. The web page may contain frames in which the content from remote sources is displayed. Users may be able to customize the appearance of the web pages produced by portals and may be able to select the content provided by the portal. Portal server 106 may operate IBM WebSphere® Portal Server Version 6.0.

The web pages produced by portal server 106 may receive hits from client devices such as client devices 120, 130, 140, 150, and 160 which may request web page content provided by portlet server 110. Portal server 106 may request the web page content. In response, portlet server 110 may generate a fragment of a web page and transmit the fragment to portal server 106.

Portlet server 110 may operate a portlet. The term portlet may refer to a small portal application. Portlets may function as reusable components to provide access to enterprise applications, Web-based content, host and data systems, content-management systems, process-driven workflow applications, and other resources. Web pages, Web services, applications and syndicated content feeds may be accessed through portlets. Portlet server 110 may generate fragments of web pages in response to requests from portal server 106 for web page content. Portlet server 110 may include in the fragments code to collect data from clients on web traffic of the portlet and to transmit the data to a facility for the collection of data on web traffic of the portal and the portlet.

Two sets of standards govern the operation of portlets. Web Services for Remote Portlets Specification Version 1.0 (Sep. 3, 2003) (WSRP specification), published by The Organization for the Advancement of Structured Information Standards (OASIS), describes a format for communications between portals and portlets. In the specifications, content generated by web services may be converted into a proper format for portlet output and transmitted to portals. Similarly, the Java Portlet Specification (JSR-168) (October, 2003) is a standard for portlets operating in the Java language promulgated by the Java community. The two standards are complementary. Portlets operating in Java may follow both standards.

The arrangement of servers and other devices making up the exemplary system illustrated in FIG. 1 is for explanation, not for limitation. Data processing systems for analyzing web traffic may omit a server. Data processing systems for analyzing web traffic may include additional servers, routers, other devices, and peer-to-peer architectures, not shown in FIG. 1, as will occur to those of skill in the art. For example, additional servers may provide web services. Their output may be converted into a suitable format for portlets. Similarly, additional servers may carry out Java functions or provide code libraries. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
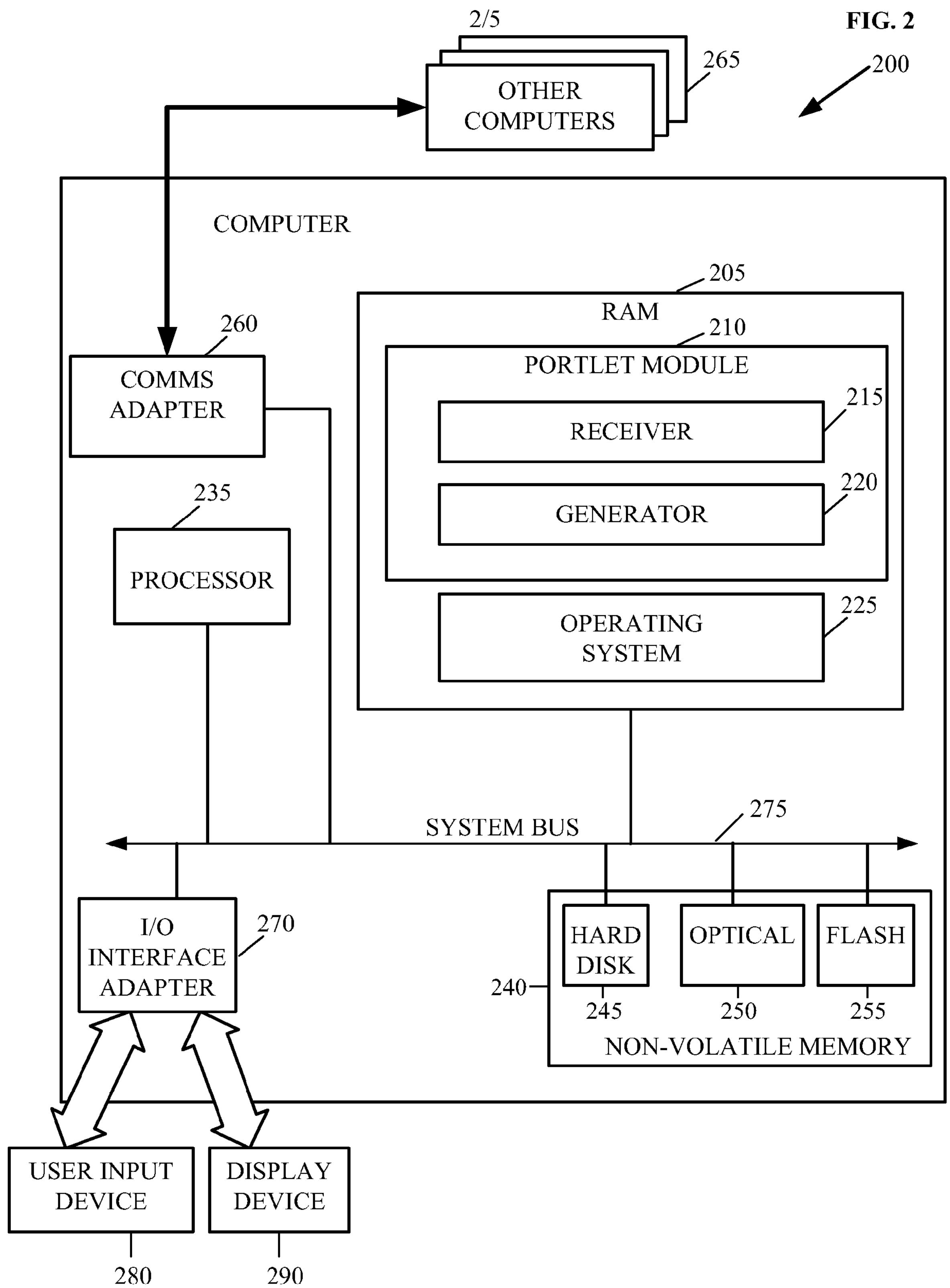
FIG. 2 depicts an embodiment of a computer capable of inserting code in a fragment of a web page to collect data on web traffic.

Turning to FIG. 2, depicted is an embodiment of a computer 200 capable of analyzing web traffic of a portal that includes random access memory (RAM) 205, a processor 235 or CPU, non-volatile memory 240, a communications adapter 260, and an Input/Output (I/O) interface adapter 270 connected by system bus 275. Stored in RAM 205 are a portlet module 210 and an operating system 225. Portlet module 210 may comprise computer program instructions for generating fragments of a web page and transmitting them to a portal. Portlet module 210 includes receiver 215 to receive requests for fragments of web pages from portals and generator 220 to generate fragments of web pages responsive to the requests and to insert code within the fragments of web pages. The code may collect data from clients on web traffic of the portlet and to transmit the data to a facility for the collection of data on web traffic of the portal and the portlet.

Operating system 225 may comprise UNIX™, Linux™, Microsoft Windows™, AIX™, IBM's i5/OS™, or other operating systems useful for analyzing web traffic of a portal as will occur to those of skill in the art. Portlet module 210, receiver 215, generator 220, and operating system 225 are shown in RAM 205 in FIG. 2, but many components of such software may be stored in non-volatile memory 240 also. Further, while the components of such are shown simultaneously present in RAM, in other embodiments, only some of the components of RAM 205 may be present at any given time.

Non-volatile computer memory 240 may be implemented as a hard disk drive 245, optical disk drive 250, electrically erasable programmable read-only memory space (EEPROM or Flash memory) 255, RAM drives (not shown), or as any other kind of computer memory as will occur to those of skill in the art. Communications adapter 260 may implement the hardware level of data communications through which one computer sends data communications to other computers, such as other computers 265, directly or through a network. Such data communications may be carried out serially through RS-232 connections, through external buses such as USB, through data communications networks such as IP networks, and in other ways as will occur to those of skill in the art. Examples of communications adapters useful for useful for analyzing web traffic of a portal as will occur to those of skill in the art include modems for wired dial-up communications, Ethernet (IEEE 802.3) adapters for wired network communications, and 802.11b adapters for wireless network communications.

I/O interface adapter 270 implements user-oriented I/O through, for example, software drivers and computer hardware for controlling output to display devices such as display device 280 as well as user input from user input device 290. User input device 290 may include both a keyboard and a mouse. Some embodiments may include other user input devices such as speech interpreters, bar code scanners, text scanners, tablets, touch screens, and/or other forms of user input devices.

The computer and components illustrated in FIG. 2 are for explanation, not for limitation. In some other embodiments, embedded systems and other network-enabled devices may generate fragments of web pages in response to requests from portals and may insert code to collect data on web traffic in the fragment of the web page. In many other embodiments, the portlet module, the receiver, and the generator may be implemented in hardware, firmware, or in state machines or may form a component of an operating system.

Figure 3:
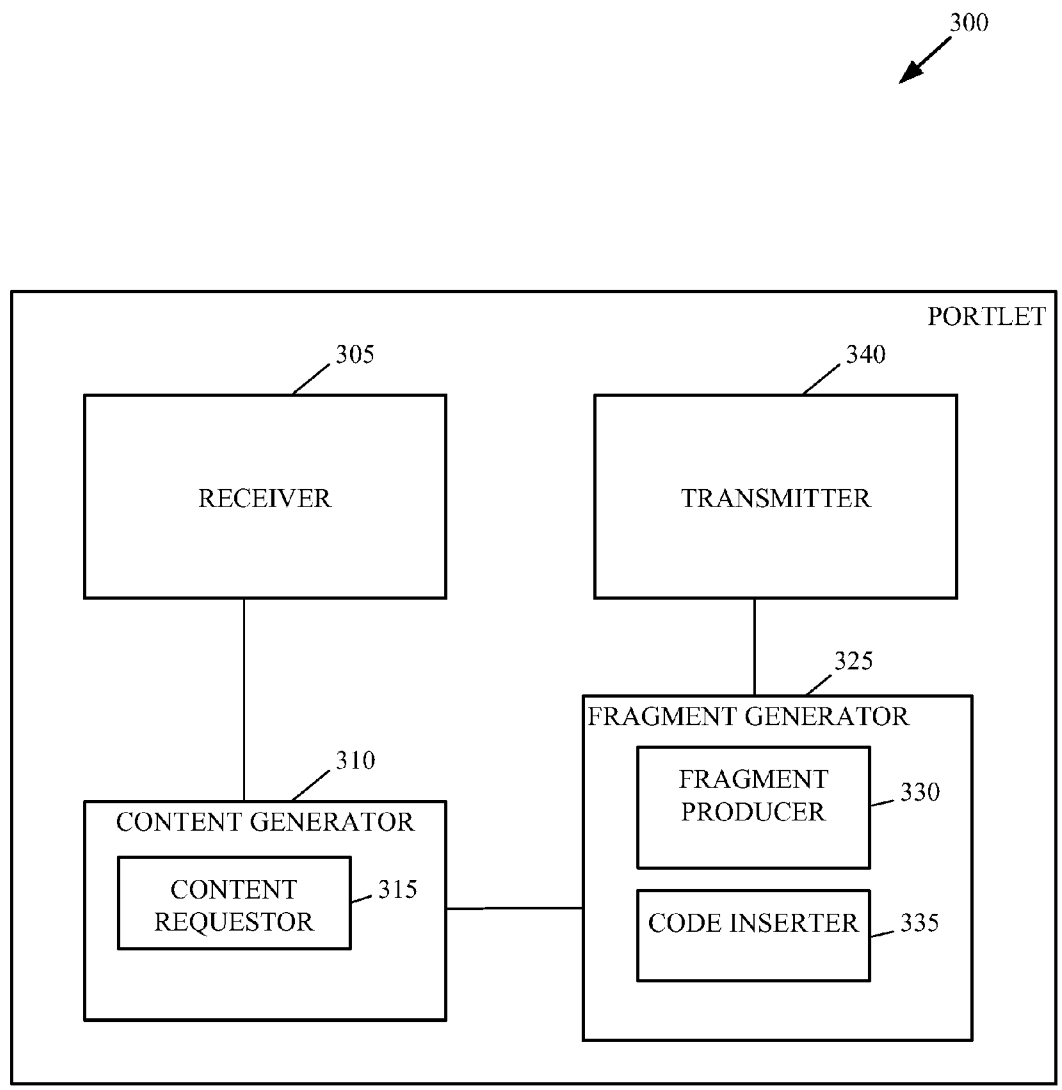
FIG. 3 depicts an embodiment of a portlet capable of inserting code in a fragment of a web page to collect data on web traffic.

Turning to FIG. 3, depicted is an embodiment of a portlet 300 that includes a receiver 305, a content generator 310, a fragment generator 325, and a transmitter 340. Receiver 305 may receive a request for a fragment of a web page from a portal. Receiver 305 may be implemented in hardware or software. For example, a receiver on a portlet may consist of a network interface card, a USB port, or a terminal adapter on a PCI (peripheral component interconnect) card. Receiver 305 may receive the request for a fragment of a web page in a variety of forms such as an HTTP request or a request for web services.

Content generator 310 may produce content to be included in the fragment of a web page produced by portlet 300. Content generator 310 includes content requester 315. Content requester 315 may obtain content from an external source, such as a web service which provides weather information or stock quotes. In other embodiments, content generator 310 may itself generate content. Content generator 310 may, for example, consist of a data base.

Fragment generator 325 includes fragment producer 330 and code inserter 335. Fragment producer 330 may produce a fragment of a web page responsive to a request from a portal. The content of the fragment may be provided by content generator 310. Fragment producer 330 may, for example, package content provided by content generator 310 into an HTML fragment. Code inserter 335 may insert code to collect data on web traffic in the fragment of a web page produced by fragment producer 330. The code may also transmit the data to a facility for the collection of data on web traffic of the portal and the portlet 300.

Transmitter 340 may transmit the fragment of a web page produced by fragment generator 325 to the requesting portal according to a protocol agreed upon between the portal and portlet 300. The protocol may adhere to the WSRP standard, the JSR 168 standard or both. Transmitter 340 may be implemented in hardware or software.

FIG. 3 is for illustration and not limitation. Other embodiments may comprise different modules with different submodules. In many embodiments, a portlet may include a code library of functions to collect data on web traffic. The code library may consist of a Java class library or a Java tag library. In a few embodiments, fragment producer 330 and code inserter 335 may form a single module.

Figure 4:
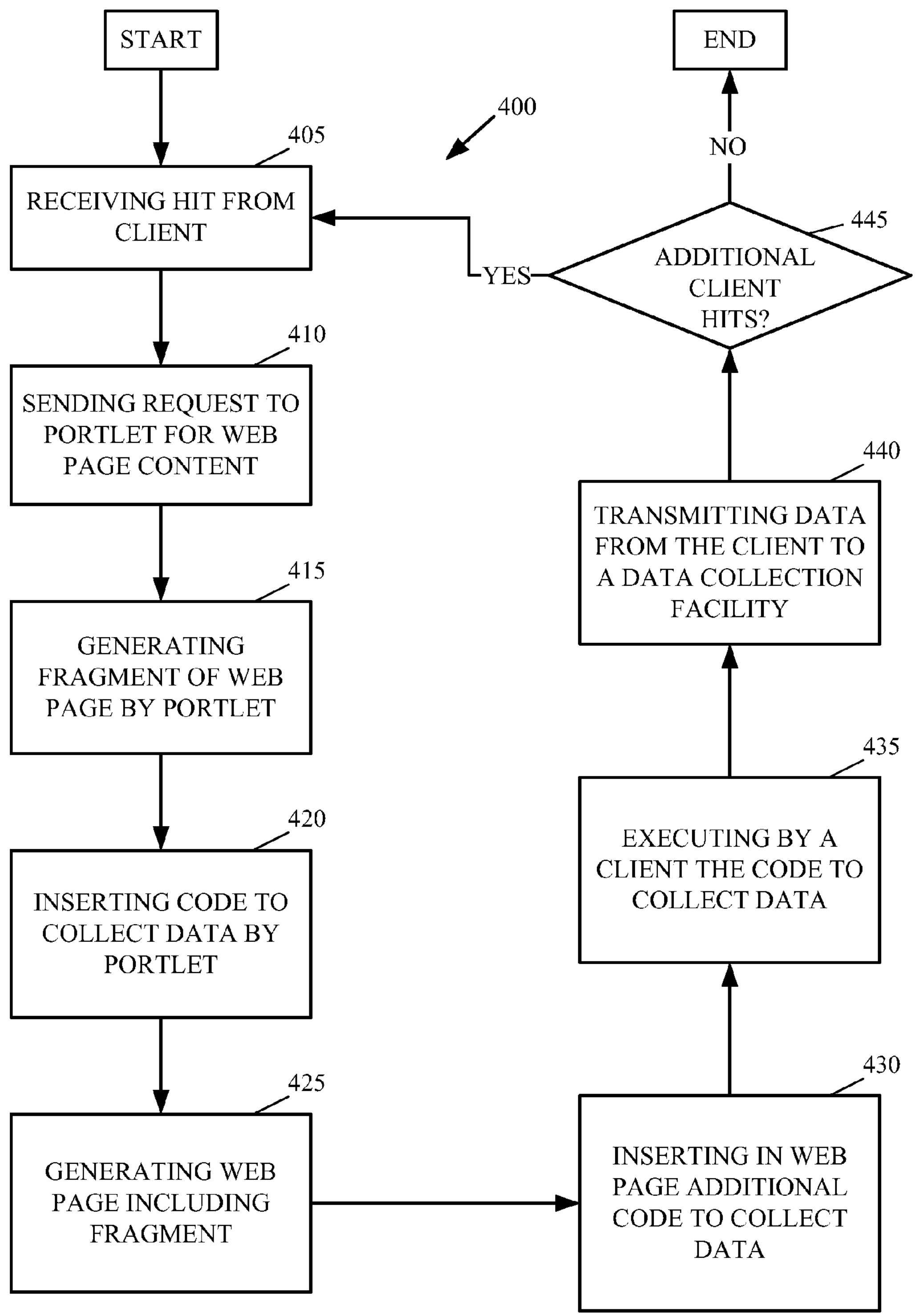
FIG. 4 depicts a flowchart of an embodiment to analyze the web site traffic of portals.

FIG. 4 depicts a flowchart of an embodiment to analyze web traffic of a portal. Flowchart 400 of FIG. 4 includes receiving a hit from a client (element 405). The hit may represent an end user requesting web content from a portal through use of a web browser. The hit may request data provided to the portal from a portlet. For example, the user may click on a portion of a web page representing access to content provided by a portlet, such as a portion of the web page illustrated in FIG. 5.

Figure 5:
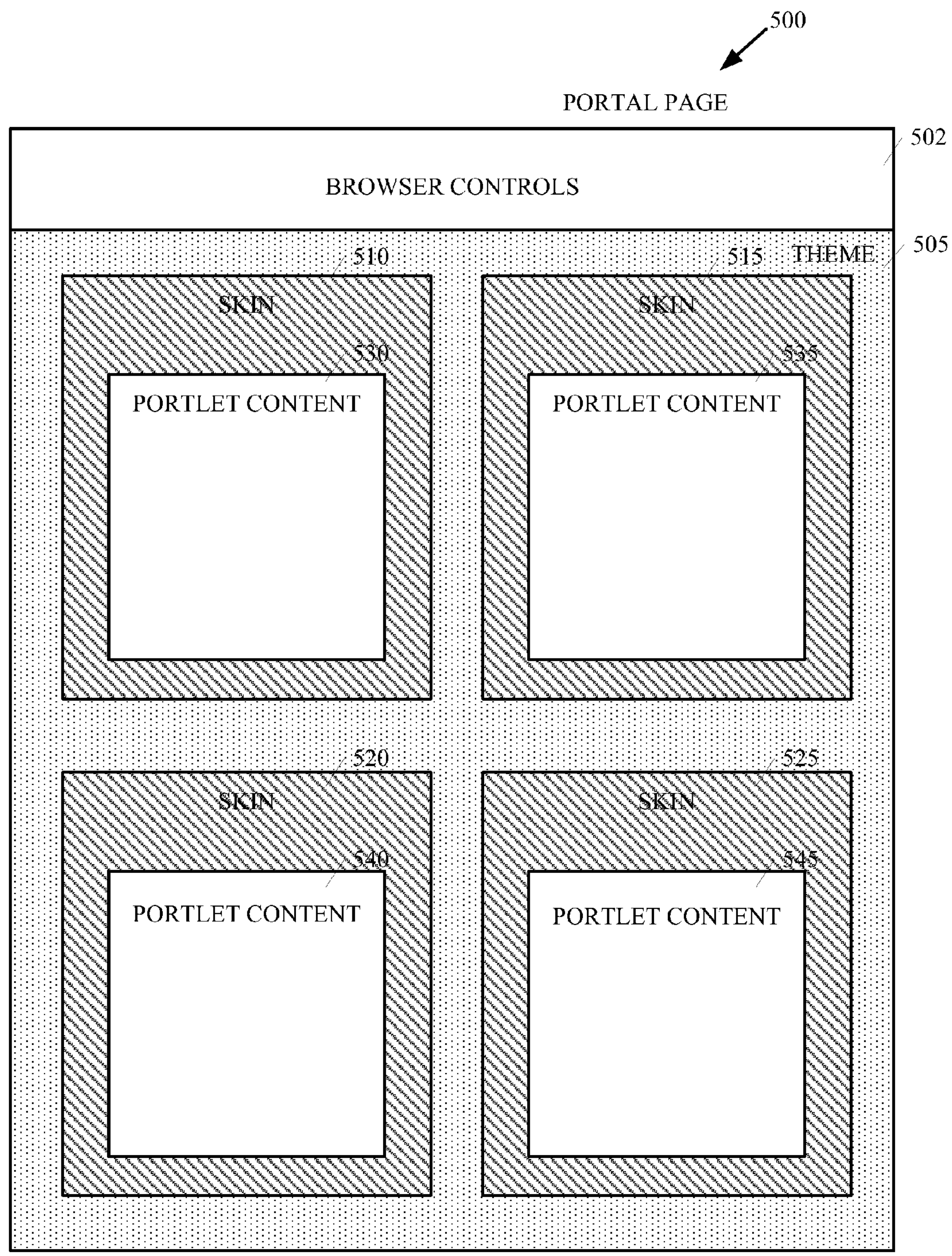
FIG. 5 depicts the layout of an example web page generated by a portal.

Turning to FIG. 5, illustrated is a layout of an example web page 500 which may be generated by a portal according to the method of FIG. 4. The layout of portal page 500 includes browser controls 502, theme 505, skins 510, 515, 520, and 525, and portlet content 530, 535, 540, and 545. The browser controls may include browser interface objects such as a title, menu bar, address bar, and icons for navigation, printing a page, and saving a page. The theme 505 includes portions of the web page not occupied by the browser controls, portlet contents, and skins. The theme 505 may provide the appearance and layout of the portal page 500, including colors, fonts, and images, and may provide for navigation within the portal page. For example, the theme 500 area may include a border and a title, navigation tabs, navigation trees, and other page-level text and graphics. A tab bar may represent multiple screens. A user may click on a tab from the tab bar to go to a particular screen.

The skins 510, 515, 520, 525 may represent the borders of areas of content provided by portlets. The skins 510, 515, 520, 525 may contain a title bar, title bar controls, toolbars and menus for interacting with the portlets. They may also contain controls to change the state of the portlet display. The controls may allow the end user to minimize the display allocated to a portlet, to maximize the display to the entire area of portal page 500, or to use the normal display of the portlet contents illustrated by FIG. 5.

Portlet content 530, 535, 540, and 545 represents a display area for portlet content. For example, a portal page may display contents from portlets which show the weather, breaking sports news, stock quotations, and email. An end user may interact with a portlet by clicking on the areas of portlet content 530, 535, 540, and 545. As a result of the interaction, the end user may request data or other content from a portlet. The request for the data is transmitted from the portal to the portlet. For example, an end user may click on a link displayed in the area to visit the web page represented, or may enter a search term and type Enter to conduct a search of data provided by a portlet.

A portlet displaying content in portlet content 530, 535, 540, and 545 may receive from the portal a request for web page content. The portlet may generate a fragment of a web page responsive to the request for display in one of the portlet content areas. The portlet may insert code in the fragment. The code may collect data from clients on web traffic of the portlet and transmit the data to a facility for the collection of data on web traffic of the portal and the portlet. The portlet may also transmit the fragment of a web page to the portal.

Returning to FIG. 4, the portal may send a request to a portlet for web page content (element 410). For example, an end user may request information from a portlet by clicking on the portion of the portal web page displaying portlet content, such as one of the portlet content areas in FIG. 5. The portal may transmit the request for the information to a portlet. The portlet may generate a fragment of a web page (element 415) in response to the request. The fragment may comprise markup language, one format for writing web pages. Markup language is a language including text and marks used to delimit expressions.

Perhaps the most popular markup language used for web pages is the HyperText Markup Language (HTML). HTML may be used to describe how the text of a web page should appear on a web page by including such information as formatting, placement on the page, and structure of the page. HTML may also contain links to other Web resources identified by Uniform Resource Locators (URLs). A URL is a special syntax identifier defining a communications path to specific information. Each logical block of information accessible to a client is identified by a URL. The URL provides a universal, consistent method for finding and accessing this information.

The portlet may insert code to collect data on web traffic in the fragment of the web page (element 420). For example, the code inserted by the portlets may collect data about the interaction between the end user and the portlet, such as search terms supplied to the portlet. In some embodiments, the code may encapsulate data generated in the interaction between the end user and the client; that is, the code may include specific data in its instructions. The code might be the equivalent, for example, of the instruction:

report_to_Collector (attribute "search_term" "IBM").

This fictitious instruction, when executed by a browser, might cause the browser to report to the data collection facility that the browser received a web page in response to transmitting to the portlet the search term "IBM."

In other embodiments, the code may provide more general instructions to browsers to extract the data from the web page or from other sources. The code may, for example, instruct a browser to report all URLs contained in the web page. The code may also instruct the browser to collect information about the portal page, the display of the portlet within the portlet page, and other information about the portal page not available to the portlet. In the terminology of FIG. 5, the code may instrument the theme and skins of the portal page.

In some embodiments, the portlet may directly produce the fragment of a web page including the code to be executed by a browser to collect data on web traffic. In these embodiments, the code may be written in any of a variety of programming languages supported by web browsers. These general purpose client-side languages for browsers include JavaScript, the Microsoft version JScript, and the ECMA version ECMAScript (for European Computer Manufacturers Association); VBScript, based on Visual Basic; Cascading Style Sheets (CSS); and Java applets. Java applets are applications which are loaded into a Java virtual machine. Special HTML tags invoke a browser plug-in to load the applets.

In other embodiments, the portlet may provide instructions to the portal on how to produce the fragment. The portlet may, for example, generate code which the portal executes to produce the fragment of a web page and the code for the browser. The code generated by the portlet may consist, for example, of Java code. Class libraries may be provided to simplify the writing of the code.

Alternatively, the code may consist of JavaServer pages (JSP). JSP may provide a convenient way to create dynamic web pages. JSP consists of portions of HTML representing web pages with tags representing Java code. Execution of the code may modify the HTML making up web page or may perform other actions. Following is an example of a portion of JSP:

```
<%
    for (int i = 0; i < 3; i++) {
%>
    <TR>
        <TD> "column 1" </TD>
        <TD> "column 2" </TD>
    </TR>
<% } %>
```

The tags (beginning and end markings) "<%" and "%>" mark Java code. The code in line 2 is a loop which repeats three times, as the variable "i" runs from 0 to 2. The next portion of the JSP, contained between the "<TR" and "</TR>" tags in lines 4 through 7, consists of HTML which may print column headers for a table. The final line of the JSP is another fragment of Java code, a closing bracket to match the bracket in line 2.

Tag libraries, libraries of custom actions which may be called by inserting tags into the JSP, may also be provided to simplify generating code to collect data. An example call to obtain the date might be written as:

```
<sample:getDate/>
```

where getDate is a function defined in a tag library.

JSP tag libraries and Java class libraries may enable the generation of code in JavaScript or other browser languages for the collection of data on web traffic of a portal. The Java class libraries may provide code to implement the tag library and to allow portlet content Java code to pass data without requiring the use of a JSP. Since different data is available at each level of the portal page, the JSP tag libraries may contain tags for the following:

- Theme tags: Collect page title and user id, and insert JavaScript calls to send data to the collection server
- Skin tags: Collect and externalize the portlet title and the portlet state (whether minimized or not)
- Portlet content tags: Collect and externalize arbitrary portlet data, including alternate titles, actions, and parameters.

The Java class libraries may include classes to provide similar functionality. A JavaScript code library may include functions used by the tag library and Java library to save data for each segment of a portal page. The JavaScript code library may also include functions to send the collected to a data collection facility.

The method of FIG. 4 also includes generating a web page including the fragment (element 425). A portal may execute code received from a portlet to produce HTML representing a fragment of a web page, and may supplement the fragment with other HTML to produce an entire web page. In the example web page of FIG. 5, a portal may receive from portlets fragments of web pages which describe the content of portlet content areas 530, 535, 540, and 545. The portal may supplement the fragments with HTML describing the content of theme area 505 and the content of skins areas 510, 515, 520, and 525. In some embodiments, the portlet content may be represented as nested tables in the HTML representing the entire web page.

The portal may insert in the web page additional code to collect data about web traffic (element 430) to supplement data to be collected by code generated by the portlet. In the absence of code from a portlet, the portal may insert code to collect page-level data from the theme of a portal page, such as the current page (selected tabs when a page contains a tab bar), the name of the portal page being displayed, and the user id of the end user. The end user may, for example, be required to log into the portal page. Similarly, in the absence of code from a portlet, the portal may insert code to collect skin-level data such the names of all of the portlets on the page and the states of the portlets on the page (normal, minimized, or maximized).

The client may execute the code inserted by the portlet and portal into the web page (element 435). The client may be the web browser or other application used by the end user to visit the portal page. Execution of the code may result in the retrieval of information about the interaction between the client, the portal and the portlet and the packaging of the information into a single document. The document or other data about the web site traffic of the portal may be generated when the end user revisits a cached web page. The cached web page may be retrieved without additional contact with the portal.

The data about the web site traffic may be transmitted from the client to a data collection agency (element 440). The data collection agency may then analyze the data and transmit it to interested parties, such as portlets and the portal. In many embodiments, the data collection agency may be separate from the portal. In some of these embodiments, the method of FIG. 4 may enable the transmission to a portlet of data on web traffic without the need for the forwarding of the data by a portal.

If there are additional hits from a client to the portal page, each element of flowchart 400 from element 405 to element 440 may be repeated. Otherwise, the analyzing of the web traffic of portals may end.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for analyzing web traffic of a portal accessible from a computer-usable or computer-readable medium providing program code for use by or in connection with a computer or any instruction execution system. For the purposes of this description, a computer-usable or computer readable medium can be any apparatus that can store the program for use by or in connection with the instruction execution system, apparatus, or device.

The medium can be an electronic, magnetic, optical or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements to analyze web site traffic. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for analyzing web traffic, the method comprising the steps of:

a first computer comprising a portlet receiving a request from a portal for web page content;

in response to the step of the first computer receiving the request, the first computer generating a fragment of a web page, the fragment comprising content of the web page;

the first computer inserting, into the fragment, program code to collect web traffic data from a second computer;

the first computer inserting, into the fragment, program code to transmit the web traffic data to a facility for collecting web traffic data of both the portlet and the portal; and the first computer transmitting the fragment to the portal.

2. The method of claim 1, wherein the step of the first computer inserting, into the fragment, the program code to collect the web traffic data comprises the first computer inserting, into the fragment, program code to collect a search term supplied to the portlet.

3. The method of claim 1, wherein the step of the first computer inserting, into the fragment, the program code to collect the web traffic data comprises the first computer inserting, into the fragment, program code to extract the web traffic data from the web page.

4. The method of claim 3, wherein the step of the first computer inserting, into the fragment, the program code to extract the web traffic data from the web page comprises the first computer inserting, into the fragment, program code to instruct a web browser to report a uniform resource locator (URL) contained in the web page.

5. A method for analyzing web traffic, the method comprising the steps of:

a first computer comprising a portal receiving, from a second computer, a request for web page content;

in response to the step of the first computer receiving the request for the web page content, the first computer requesting the web page content from a portlet;

in response to the step of the first computer requesting the web page content from the portlet, the first computer receiving one of: (i) a fragment of a web page, the fragment comprising content, program code to collect web traffic data from a client, and program code to transmit the web traffic data to a facility for collecting web traffic data of both the portal and the portlet, and (ii) program code to generate the fragment of the web page;

the first computer generating the web page, the web page comprising the fragment; and the first computer transmitting the web page to the second computer.

6. The method of claim 5, further comprising the step of:

the first computer executing the program code to generate the fragment of the web page.

7. The method of claim 5, further comprising the step of:

the first computer inserting into the web page program code to collect additional web traffic data.

8. A computer system for analyzing web traffic, the computer system comprising:

one or more processors, one or more computer readable memories and one or more computer-readable tangible storage devices;

program instructions, stored on at least one of the one or more storage devices for execution by at least one of the one or more processors via at least one of the one or more memories, to receive, in a portlet, a request from a portal for web page content;

program instructions, stored on at least one of the one or more storage devices for execution by at least one of the one or more processors via at least one of the one or more memories, responsive to receiving the request, to generate a fragment of a web page, the fragment comprising content of the web page;

program instructions, stored on at least one of the one or more storage devices for execution by at least one of the one or more processors via at least one of the one or more memories, to insert, into the fragment, program code to collect web traffic data from a computer;

program instructions, stored on at least one of the one or more storage devices for execution by at least one of the one or more processors via at least one of the one or more memories, to insert, into the fragment, program code to transmit the web traffic data to a facility for collecting web traffic data of both the portlet and the portal; and program instructions, stored on at least one of the one or more storage devices for execution by at least one of the one or more processors via at least one of the one or more memories, to transmit the fragment to the portal.

9. The computer system of claim 8, wherein the program instructions to insert, into the fragment, the program code to collect the web traffic data from the computer comprise program instructions to insert, into the fragment, program code to collect a search term supplied to the portlet.

10. The computer system of claim 8 wherein the program instructions to insert, into the fragment, the program code to collect the web traffic data from the computer comprise program instructions to insert, into the fragment, program code to extract the web traffic data from the web page.

11. A computer program product for analyzing web traffic, the computer program product comprising:

one or more computer-readable tangible storage devices;

program instructions, stored on at least one of the one or more storage devices, to receive, in a portlet, a request from a portal for web page content;

program instructions, stored on at least one of the one or more storage devices, responsive to receiving the request, to generate a fragment of a web page, the fragment comprising content of the web page;

program instructions, stored on at least one of the one or more storage devices, to insert, into the fragment, program code to collect web traffic data from a computer;

program instructions, stored on at least one of the one or more storage devices, to insert, into the fragment, program code to transmit the web traffic data to a facility for collecting web traffic data of both the portlet and the portal; and program instructions, stored on at least one of the one or more storage devices for execution by at least one of the one or more processors, to transmit the fragment to the portal.

12. The computer program product of claim 11, wherein the program instructions to insert, into the fragment, the program code to collect the web traffic data from the computer comprise program instructions to insert, into the fragment, program code to collect a search term supplied to the portlet.

13. The computer program product of claim 11, wherein the program instructions to insert, into the fragment, the program code to collect the web traffic data from the computer comprise program instructions to insert, into the fragment, program code to extract the web traffic data from the web page.

14. The method of claim 3, wherein the step of the first computer inserting, into the fragment, the program code to extract the web traffic data from the web page comprises the first computer inserting, into the fragment, program code to instruct a web browser to collect information about a portal page.

15. The method of claim 3, wherein the step of the first computer inserting, into the fragment, the program code to extract the web traffic data from the web page comprises the first computer inserting, into the fragment, program code to instruct a web browser to collect information about a display of the portlet within a portal page.

16. The computer system of claim 10, wherein the program instructions to insert, into the fragment, the program code to extract the web traffic data from the web page comprise program instructions to insert, into the fragment, program code to instruct a web browser to report a uniform resource locator (URL) contained in the web page.

17. The computer system of claim 10, wherein the program instructions to insert, into the fragment, the program code to extract the web traffic data from the web page comprise program instructions to insert, into the fragment, program code to instruct a web browser to collect information about a portal page.

18. The computer system of claim 10, wherein the program instructions to insert, into the fragment, the program code to extract the web traffic data from the web page comprise program instructions to insert, into the fragment, program code to instruct a web browser to collect information about a display of the portlet within a portal page.

19. The computer program product of claim 13, wherein the program instructions to insert, into the fragment, the program code to extract the web traffic data from the web page comprise program instructions to insert, into the fragment, program code to instruct a web browser to report a uniform resource locator (URL) contained in the web page.

20. The computer program product of claim 13, wherein the program instructions to insert, into the fragment, the program code to extract the web traffic data from the web page comprise program instructions to insert, into the fragment, program code to instruct a web browser to collect information about a portal page.

21. The computer program product of claim 13, wherein the program instructions to insert, into the fragment, the program code to extract the web traffic data from the web page comprise program instructions to insert, into the fragment, program code to instruct a web browser to collect information about a display of the portlet within a portal page.

* * * * *